US012615503B2

(12) United States Patent
Somaskandan et al.

(10) Patent No.: US 12,615,503 B2
(45) Date of Patent: Apr. 28, 2026

(54) MECHANISM FOR ACCESSING SUBSCRIPTION DATA

(71) Applicant: Nokia Solutions and Networks Oy, Espoo (FI)

(72) Inventors: Muthuswamy Somaskandan, Bengaluru (IN); Pradyumna Ram Prasad, Bangalore (IN); Harish Muralidhara, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 217 days.

(21) Appl. No.: 18/190,546

(22) Filed: Mar. 27, 2023

(65) Prior Publication Data

US 2023/0308854 A1 Sep. 28, 2023

(30) Foreign Application Priority Data

Mar. 28, 2022 (IN) .............................. 202241018031

(51) Int. Cl.
*H04W 8/18* (2009.01)
*G06F 16/242* (2019.01)

(52) U.S. Cl.
CPC ............ *H04W 8/18* (2013.01); *G06F 16/242* (2019.01)

(58) Field of Classification Search
CPC ........... H04W 8/18; H04W 8/20; H04W 8/08; H04W 8/02; G06F 16/242
See application file for complete search history.

(56) References Cited

U.S. PATENT DOCUMENTS 5,881,144 A * 3/1999 Havens ................ H04Q 3/0029
379/221.09
12,150,208 B2 * 11/2024 Castellanos Zamora ....................
H04W 8/186
2023/0101453 A1 * 3/2023 Nayak ................... H04W 60/04
370/329

OTHER PUBLICATIONS

"3rd Generation Partnership Project; Technical Specification Group Core Network and Terminals; 5G System; Usage of the Unified Data Repository services for Subscription Data; Stage 3 (Release 17)", 3GPP TS 29.505, V17.5.0, Dec. 2021, pp. 1-239.
"3rd Generation Partnership Project; Technical Specification Group Core Network and Terminals; 5G System; Unified Data Management Services; Stage 3 (Release 17)", 3GPP TS 29.503, V17.5.0, Dec. 2021, pp. 1-466.

(Continued)

*Primary Examiner* — Kabir A Timory
(74) *Attorney, Agent, or Firm* — Nokia Technologies Oy

(57) ABSTRACT

An apparatus for use by a management network element or management network function of a communication network, the apparatus comprising at least one processing circuitry, and at least one memory for storing instructions to be executed by the processing circuitry, wherein the at least one memory and the instructions are configured to, with the at least one processing circuitry, cause the apparatus at least: to provide, with a request for data, query information as a part of a data retrieving process to read subscription data from a data repository element or data repository function, the query information being set for filtering sub-resources of subscription information within subscription data and for (Continued)

requesting a return of data according to the request in a single response, and to receive the requested data with the single response.

20 Claims, 10 Drawing Sheets

(56)                    References Cited

OTHER PUBLICATIONS

3rd Generation Partnership Project; Technical Specification Group Core Network and Terminals; 5G System; Unified Data Repository Services; Stage 3 (Release 17), 3GPP TS 29.504, V17.5.0, Dec. 2021, pp. 1-42.

"3rd Generation Partnership Project; Technical Specification Group Core Network and Terminals; 5G System; Network Function Repository Services; Stage 3 (Release 17)", 3GPP TS 29.510, V17.4.0, Dec. 2021, pp. 1-284.

3rd Generation Partnership Project; Technical Specification Group Core Network and Terminals; 5G System; Common Data Types for Service Based Interfaces; Stage 3 (Release 17), 3GPP TS 29.571 , V17.4.0, Dec. 2021, pp. 1-165.

"OpenAPI Specification v3.0.0", Openapis, Retrieved on Apr. 16, 2023, Webpage available at : https://spec.openapis.org/oas/v3.0.0.

"3rd Generation Partnership Project; Technical Specification Group Core Network and Terminals; 5G System; Technical Realization of Service Based Architecture; Stage 3 (Release 17)", 3GPP TS 29.500 , V17.5.0, Dec. 2021, pp. 1-117.

Extended European Search Report received for corresponding European Patent Application No. 23164251.3, dated Aug. 21, 2023, 10 pages.

"3rd Generation Partnership Project; Technical Specification Group Core Network and Terminals; 5G System; Usage of the Unified Data Repository services for Subscription Data; Stage 3 (Release 17)", 3GPP TS 29.505, V17.6.0, Mar. 2022, pp. 1-278.

"UDM to support Optimized EventExposure Subscriptions Data access over Nudr", 3GPP TSG-CT WG4 Meeting #109-e, C4-222292, Nokia, Apr. 6-12, 2022, 5 pages.

"EE-Subscription retrieval optimization", 3GPP TSG-CT WG4 Meeting #110-e, C4-223088, Nokia, May 12-20, 2022, 9 pages.

"3rd Generation Partnership Project; Technical Specification Group Core Network and Terminals; 5G System; Analytics Data Repository Services Stage 3 (Release 17)", 3GPP TS 29.575, V0.5.0, Mar. 2022, pp. 1-49.

\* cited by examiner

MECHANISM FOR ACCESSING SUBSCRIPTION DATA

FIELD

Examples of embodiments relate to apparatuses, methods, systems, computer programs, computer program products and (non-transitory) computer-readable media usable for accessing subscription data. Specifically, some examples of embodiments relate to apparatuses, methods, systems, computer programs, computer program products and (non-transitory) computer-readable media usable for accessing subscription data stored in a repository network element or repository network function by a data management network element or data management network function allowing an improved access control.

BACKGROUND

The following meanings for the abbreviations used herein apply:
3GPP 3$^{rd}$ Generation Partnership Project
4G fourth generation
5G fifth generation
5GS 5G system
AF application function
AMF access and mobility function
AN access network
API application programming interface
BS base station
CPU central processing unit
DN data network
EE event exposure
eNB E-UTRAN Node B
gNB next generation node B
HSS home subscriber server
ID identification
IP Internet protocol
LTE Long Term Evolution
LTE-A LTE Advanced
NEF network exposure function
NF network function
NW network, network side
PCF policy control function
RAN radio access network
SMF session management function
UDM unified data management
UDR unified data repository
UE user equipment
UPF user plane function

SUMMARY

According to an example of an embodiment, there is provided, for example, an apparatus for use by a management network element or management network function of a communication network, the apparatus comprising at least one processing circuitry, and at least one memory for storing instructions to be executed by the processing circuitry, wherein the at least one memory and the instructions are configured to, with the at least one processing circuitry, cause the apparatus at least: to provide, with a request for data, query information as a part of a data retrieving process to read subscription data from a data repository element or data repository function, the query information being set for filtering sub-resources of subscription information within subscription data and for requesting a return of data according to the request in a single response, and to receive the requested data with the single response.

Furthermore, according to an example of an embodiment, there is provided, for example, a method for use in a management network element or management network function of a communication network, the method comprising providing, with a request for data, query information as a part of a data retrieving process to read subscription data from a data repository element or data repository function, the query information being set for filtering sub-resources of subscription information within subscription data and for requesting a return of data according to the request in a single response, and receiving the requested data with the single response.

According to further refinements, these examples may include one or more of the following features:
    the response may be processed for retrieving subscription data related to a communication element or communication function;
    the subscription data may be comprised in event exposure subscription resources including a plurality of individual event exposure subscriptions having subscription information of a communication element or communication function for at least one communication network element or communication network function;
    the query information may indicate at least one of a specific communication network element type or communication network function type, and an identification of a designated communication network element or a designated communication network function;
    a communication network element or communication network function to which the query information is related may comprise at least one of a home subscriber server, an access and mobility management element or access and mobility management function, and a session management element or session management function of the communication network;
    the data retrieving process may be triggered by an event causing a further processing based on retrieved subscription data;
    a subscription procedure for creating an event exposure subscription of a communication element or communication function in the data repository element or data repository function may be executed;
    the data retrieving process may be conducted by using a communication via an application programming interface to the data repository element or data repository function and data may be requested by using a get message including an indication that subscription data are requested, an identification of a communication element or communication function, an indication that context data are concerned, an indication regarding event exposure subscriptions and the query information represented by an indication of at least one of a specific communication network element type or communication network function type, and an identification of a designated communication network element or a designated communication network function;
    the single response including the requested data may comprise an array of subscription information including subscription information for the indicated at least one of the specific communication network element type or communication network function type, and the identified designated communication network element or designated communication network function;
    the management network element or management network function of the communication network may be a unified data management element or unified data management function of a 3GPP based communication network, and the data repository element or data repository element function may be a unified data repository element or unified data repository function of the 3GPP based communication network.

According to an example of an embodiment, there is provided, for example, an apparatus for use by a data repository element or data repository function of a communication network, the apparatus comprising at least one processing circuitry, and at least one memory for storing instructions to be executed by the processing circuitry, wherein the at least one memory and the instructions are configured to, with the at least one processing circuitry, cause the apparatus at least: to receive, with a request for data, query information as part of a data retrieving process to read subscription data from the data repository element or data repository function, the query information being set for filtering sub-resources of subscription information within subscription data and for requesting a return of data according to the request in a single response, and to provide the requested data within the single response to a management network element or management network function.

Furthermore, according to an example of an embodiment, there is provided, for example, a method for use in a data repository element or data repository function of a communication network, the method comprising receiving, with a request for data, query information as part of a data retrieving process to read subscription data from the data repository element or data repository function, the query information being set for filtering sub-resources of subscription information within subscription data and for requesting a return of data according to the request in a single response, and providing the requested data within the single response to a management network element or management network function.

According to further refinements, these examples may include one or more of the following features:

the request may be processed, wherein the query information may be considered for selecting subscription data related to a communication element or communication function to be returned to the management network element or management network function;

the subscription data may be related to a communication element or communication function and are comprised in event exposure subscription resources including a plurality of individual event exposure subscriptions having subscription information of the communication element or communication function for at least one communication network element or communication network function;

the query information may indicate at least one of a specific communication network element type or communication network function type, and an identification of a designated communication network element or a designated communication network function;

a communication network element or communication network function to which the query information is related may comprise at least one of a home subscriber server, an access and mobility management element or access and mobility management function, and a session management element or session management function of the communication network;

a subscription procedure may be executed for storing an event exposure subscription of a communication element or communication function on the basis of information provided by the management network element or management network function;

the request for data may be obtained by a communication via an application programming interface to the data repository element or data repository function, wherein the request may include a get message including an indication that subscription data are requested, an identification of a communication element or communication function, an indication that context data are concerned, an indication regarding event exposure subscriptions and the query information represented by an indication of at least one of a specific communication network element type or communication network function type, and an identification of a designated communication network element or a designated communication network function;

as the single response, an array of subscription information including subscription information for the indicated at least one of the specific communication network element type or communication network function type, or the identified designated communication network element or designated communication network function may be forwarded;

the management network element or management network function of the communication network may be a unified data management element or unified data management function of a 3GPP based communication network, and the data repository element or data repository element function may be a unified data repository element or unified data repository function of the 3GPP based communication network.

According to an example of an embodiment, there is provided, for example, an apparatus for use by a management network element or management network function of a communication network, the apparatus comprising at least one processing circuitry, and at least one memory for storing instructions to be executed by the processing circuitry, wherein the at least one memory and the instructions are configured to, with the at least one processing circuitry, cause the apparatus at least: to conduct a process for creating or modifying subscription data in a data repository element or data repository function, to include an information field in subscription information of the subscription data, wherein the information field informs that specific sub-resources of subscription information are present in subscription data, and to forward subscription data including the information field to the data repository element or data repository function.

Furthermore, according to an example of an embodiment, there is provided, for example, a method for use in a management network element or management network function of a communication network, the method comprising conducting a process for creating or modifying subscription data in a data repository element or data repository function, including an information field in subscription information of the subscription data, wherein the information field informs that specific sub-resources of subscription information are present in subscription data, and forwarding subscription data including the information field to the data repository element or data repository function.

According to further refinements, these examples may include one or more of the following features:

a data retrieving process including reading subscription data from the data repository element or data repository function may be executed, a response including requested subscription data may be received it may be checked whether the received subscription data comprises an information field indicating that specific sub-
resources of subscription information are present in
subscription data, and in case the presence of the
sub-resources is indicated, reading process of subscrip-
tion information corresponding to the sub-resources
may be triggered;

the subscription data may be related to the communication
element or communication function and may be com-
prised in event exposure subscription resources includ-
ing a plurality of individual event exposure subscrip-
tions having subscription information of the
communication element or communication function for
at least one communication network element or com-
munication network function;

the sub-resources of subscription information may be
related to at least one of a specific communication
network element type or communication network func-
tion type, and a designated communication network
element or a designated communication network func-
tion;

a communication network element or communication
network function to which the sub-resources are related
may comprise at least one of a home subscriber server,
an access and mobility management element or access
and mobility management function, and a session man-
agement element or session management function of
the communication network;

the process for creating or modifying the subscription data
may be executed by using a communication via an
application programming interface to the data reposi-
tory element or data repository function, wherein a post
message or a put message may be used for providing
the subscription data including the information field;

the management network element or management net-
work function of the communication network may be a
unified data management element or unified data man-
agement function of a 3GPP based communication
network, and the data repository element or data reposi-
tory element function may be a unified data repository
element or unified data repository function of the 3GPP
based communication network.

In addition, according to embodiments, there is provided,
for example, a computer program product for a computer,
including software code portions for performing the steps of
the above defined methods, when said product is run on the
computer. The computer program product may include a
computer-readable medium on which said software code
portions are stored. Furthermore, the computer program
product may be directly loadable into the internal memory of
the computer and/or transmittable via a network by means of
at least one of upload, download and push procedures.

BRIEF DESCRIPTION OF THE DRAWINGS

Some embodiments of the present disclosure are
described below, by way of example only, with reference to
the accompanying drawings, in which.

DETAILED DESCRIPTION

In the last years, an increasing extension of communica-
tion networks, e.g. of wire based communication networks,
such as the Integrated Services Digital Network (ISDN),
Digital Subscriber Line (DSL), or wireless communication
networks, such as the cdma2000 (code division multiple
access) system, cellular $3^{rd}$ generation (3G) like the Univer-
sal Mobile Telecommunications System (UMTS), fourth
generation (4G) communication networks or enhanced com-
munication networks based e.g. on Long Term Evolution
(LTE) or Long Term Evolution-Advanced (LTE-A), fifth
generation (5G) communication networks, cellular $2^{nd}$ gen-
eration (2G) communication networks like the Global Sys-
tem for Mobile communications (GSM), the General Packet
Radio System (GPRS), the Enhanced Data Rates for Global
Evolution (EDGE), or other wireless communication sys-
tem, such as the Wireless Local Area Network (WLAN),
Bluetooth or Worldwide Interoperability for Microwave
Access (WiMAX), took place all over the world. Various
organizations, such as the European Telecommunications
Standards Institute (ETSI), the $3^{rd}$ Generation Partnership
Project (3GPP), Telecoms & Internet converged Services &
Protocols for Advanced Networks (TISPAN), the Interna-
tional Telecommunication Union (ITU), $3^{rd}$ Generation Part-
nership Project 2 (3GPP2), Internet Engineering Task Force
(IETF), the IEEE (Institute of Electrical and Electronics
Engineers), the WiMAX Forum and the like are working on
standards or specifications for telecommunication network
and access environments.

Communication systems, such as the 5G system, are
designed to support data connectivity and services which
enable deployment of techniques such as Network Function
Virtualization (NFV) and Software Defined Networking
(SDN). These new techniques are required due to the various
different profiles of data services that shall be supported by
the 5G system. Data connectivity allows for the develop-
ment of various use cases having completely variable
requirements, whereby network operators may attempt to
fulfill these requirements as efficiently as possible.

5G systems, as an example for a communication system,
may be developed with a flat architecture in which control
plane (CP) functions are separated from user plane (UP) in order to make them scaling independent. This allows operators to use this functional split for dimensioning, deploying and adapting the network. Another idea in 5G is to reduce dependencies between the access network (AN) and the core network (CN).

Figure 1:
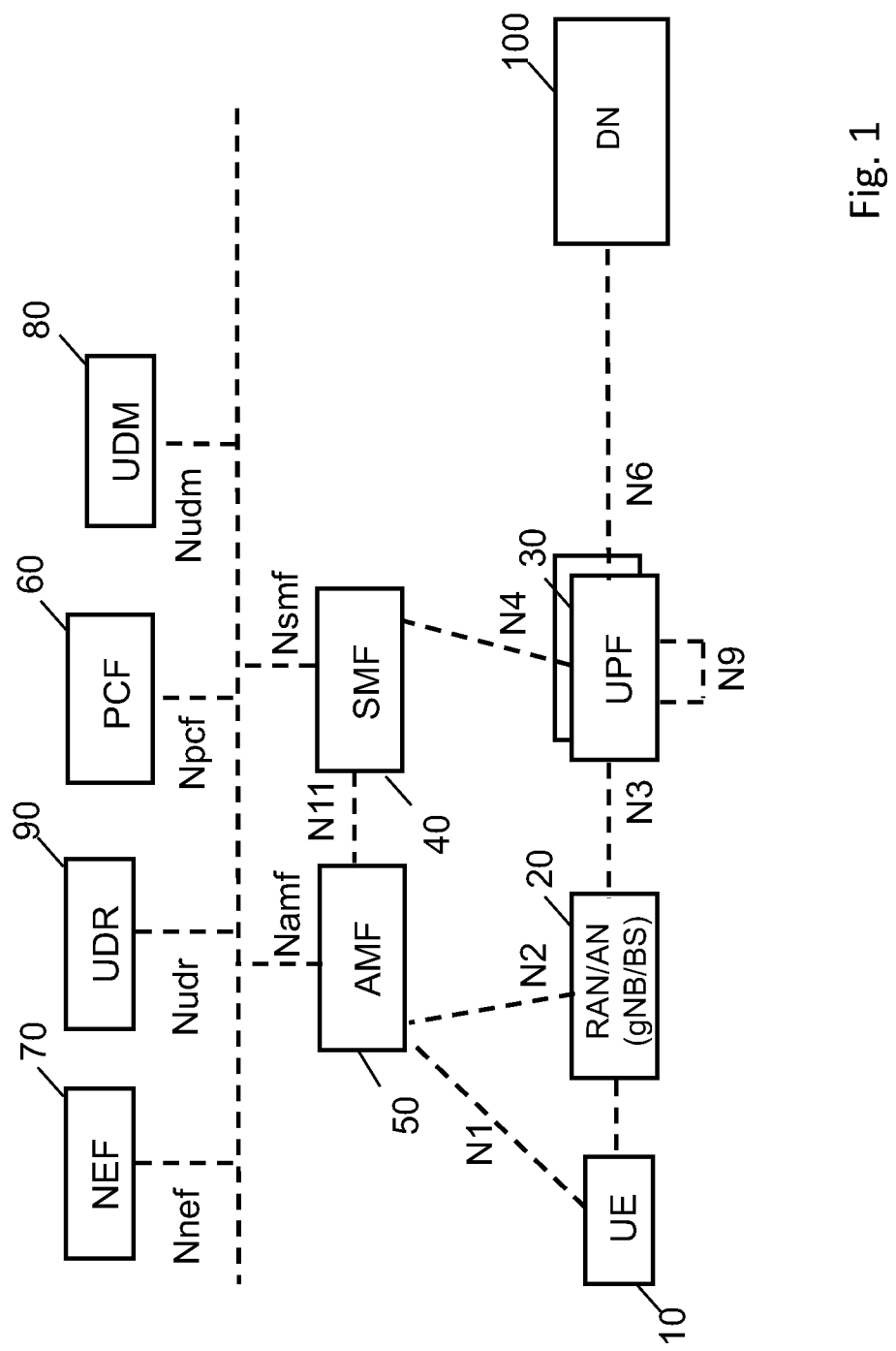
FIG. 1 shows a diagram illustrating an example of a
network architecture in which examples of embodiments are
implementable.

Specifically, FIG. 1 shows a diagram illustrating an example of a system architecture of a communication network based on 3GPP in which examples of embodiments are implementable. It is to be noted that the illustration in FIG. 1 shows those parts of a complete network architecture which are useful for understanding principles of embodiments of the disclosure, while other elements and interfaces are omitted in the illustration. Specifically, FIG. 1 shows a service-based representation of a 5G network in which one network function within the control plane allows other (authorized) network functions to access services.

As shown in FIG. 1, the 5G network comprises, amongst others, the following elements or functions.

A communication element or communication function, such as a UE 10, is connected to a RAN or access network (AN) 20 and to an access and mobility function (AMF) 50.

The UE 10 may, for example, be implemented by any device or function used directly by an end-user to communicate, such as a handheld phone, laptop, and so forth.

The RAN 20 provides a radio technology that allows access to the core network, and represents a base station (BS or NB) using a NR RAT and/or an evolved LTE base station, or a general base station including e.g. non-3GPP access, e.g., Wi-Fi or an access network termination.

Figure 2:
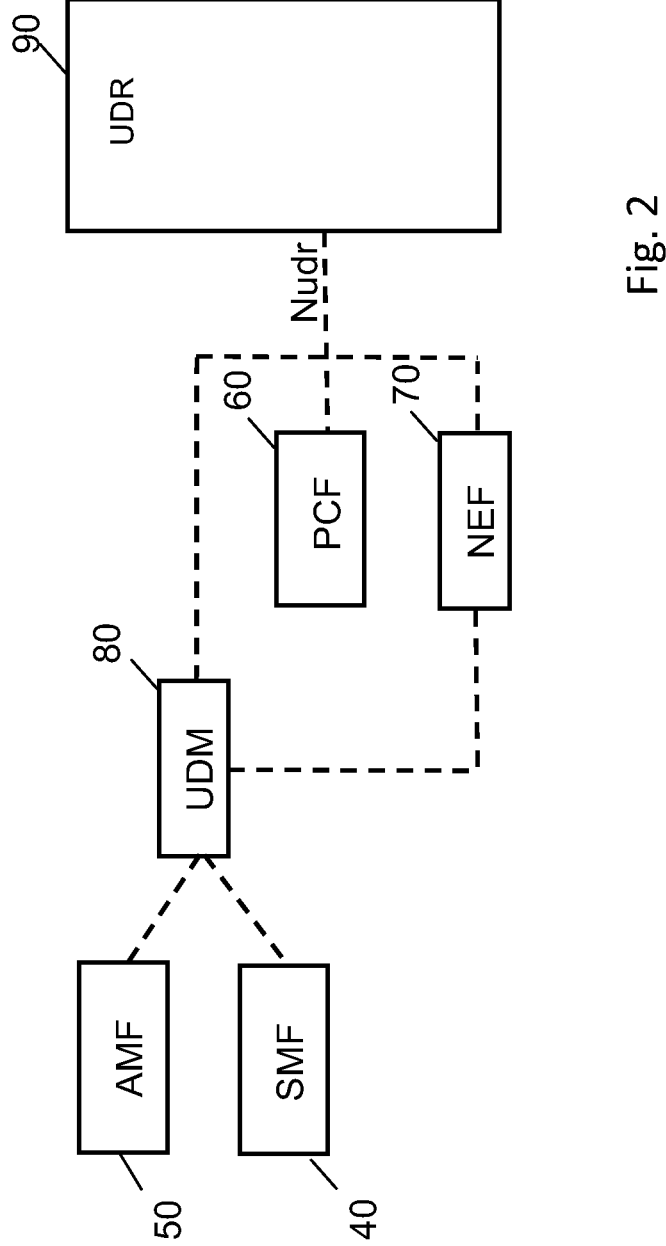
FIG. 2 shows a further diagram illustrating the example of
the network architecture in which examples of embodiments
are implementable.

The core network architecture shown in FIG. 1 (e.g. implemented as a 5GS network) comprises various NFs. As shown in FIGS. 1 and 2, the CN NFs comprise (amongst others) the AMF 50, a session management function (SMF) 40, a policy control function (PCF) 60, a network exposure function (NEF) 70, a unified data management (UDM) 80, one or more user plane function(s) (UPF) 30, and a unified data repository (UDR) 90. Furthermore, as shown in FIG. 1, a data network (DN) 100 is provided.

The AMF 50 is a function which oversees authentication, connection, mobility management between network and a device. It receives connection and session-related information from the UE, provides UE-based authentication, authorization, mobility management, and so forth. A UE (e.g. UE 10) even using multiple access technologies can be connected to a single AMF because the AMF 50 is independent of the access technologies.

The SMF 40 is a function which sets up and manages sessions according to network policy. The SMF 40 is responsible, for example, for session management and allocates IP addresses to UEs. Furthermore, it selects and controls the UPF 30 for data transfer, and controls policy enforcement. It is to be noted that it is also possible that in case the UE 10 has e.g. multiple sessions (communication connections), different SMFs may be allocated to each session to manage them individually and possibly provide different functionalities per session.

The UPF 30 can be deployed in various configurations and locations, according to the service type. Functions of the UPF 30 include e.g. QoS handling for user plane, packet routing and forwarding, packet inspection and policy rule enforcement, traffic accounting and reporting.

The PCF 60 is a function which provides a policy framework incorporating network slicing, roaming and mobility management, akin to a policy and charging rules function in a 4G network. It governs the network behavior by supporting a unified policy framework, it accesses subscription information for policy decisions taken by the UDR.

The UDM 80 is a function which stores and provides subscription data of the UE 10, akin to a home subscriber server (HSS) in 4G networks, and also network slice specific information. The UDM 80 is a centralized mechanism to control network user data, wherein data for access authorization, user registration, and data network profiles are controlled.

The NEF 70 is used for exposing network capabilities and events to an AF.

The UDR 90 stores data grouped into distinct collections of subscription-related information, such as subscription data, policy data, and application data. The data are made available to various NFs, such as subscription data being made available via the UDM front-end to a number of NFs that control UE activities within the network (e.g. AMF, SMF), policy data being made available to the PCF, and the like.

The DN 90 is a data network providing e.g. operator services, Internet access or 3rd party services.

As shown in FIG. 1, NFs can be connected by means of so-called "reference points" (N1 to N9 are shown as examples). For example, N1 is defined to carry signaling between the UE 10 and the AMF 50. The reference point for connecting the RAN/AN 20 and the AMF 50 is defined as N2, and the reference point between RAN/AN 20 and the UPF 30 is defined as N3. A reference point N11 is defined between the AMF 50 and the SMF 40, so that SMF 40 is controllable by the AMF 50. Reference point N4 is used by the SMF 40 and the UPF 30, so that the UPF 30 can be set using the control signal generated by the SMF 40, and the UPF 30 can report its state to the SMF 40. Reference point N9 is the reference point for the connection between different UPFs. Reference point N6 is defined for connecting between the UPF 30 and the DN 100. Furthermore, as shown in FIG. 1, respective core network elements or functions are connected with service-based interfaces to each other, e.g. Nnef, Nudr, Npcf, Nudm, Namf, Nsmf.

FIG. 2 shows a part of the network structure according to FIG. 1 where the data storage and retrieval functionality using the UDR is employed. Elements corresponding to those shown in FIG. 1 are denoted with the same reference number, and a repeating description thereof is omitted.

As indicated above, the 5G System Architecture allows the NFs to store and retrieve its data, both structured (e.g. subscriber or policy data) and unstructured (e.g. context or session data), into/from a central repository which is in, e.g., the UDR 90. Structured data means that schema and access interface is standardized, e.g. by the 3GPP. The UDM 80 can store and access subscriber data like the access and mobility related data or other data into/from the UDR 90. As indicated in FIG. 2, the PCF 60 may also store policy related data into the UDR 90, or the NEF 70 may store structured data for exposure and application data into the UDR 90.

As described above, the UDM 80 manages network user data. The UDM 80 can be paired with the UDR 90 which stores the user data, such as customer profile information, customer authentication information, and encryption keys for the information. The UDM can be in a stateful and stateless mode, wherein a stateful UDM keeps data on hand locally, whereas a stateless version stores data externally in the UDR.

The UDM 80 manages data for access authorization, user registration, and data network profiles. User information is stored in the UDR 90, and the UDM 80 function retrieves the data, sends it to other network functions, and generally manages it. For example, subscriber data are provided to the SMF 40, which manages user sessions on the network. The AMF 50 receives user information sent through the network and forwards the information to the SMF, which uses it e.g. as a session manager. The UDM 80 is connected to the UDR 90 via Nudr interface, for example.

Generally, UDM services may perform multiple reads towards the UDR based on existing API and resource definitions so as to retrieve all required data, for example in an EE subscriptions resource. That is, a read of individual EE subscription (IndividualEeSubscription) is made, followed by separate reads of each sub-resource, such as subscription information related to the AMF (AmfSubscriptionInfo), subscription information related to the SMF (SmfSubscriptionInfo), and also subscription information related to an home subscriber server (HSS) (HssSubscriptionInfo).

It, therefore, can occur that a large number of read procedures are to be conducted. However, these multiple reads towards the UDR could result in some attempts to read non-existent resources in the UDR, performance degradation at the UDR, a service consumer, and all NFs in the path, in addition to increased network resource consumption.

Figure 3:
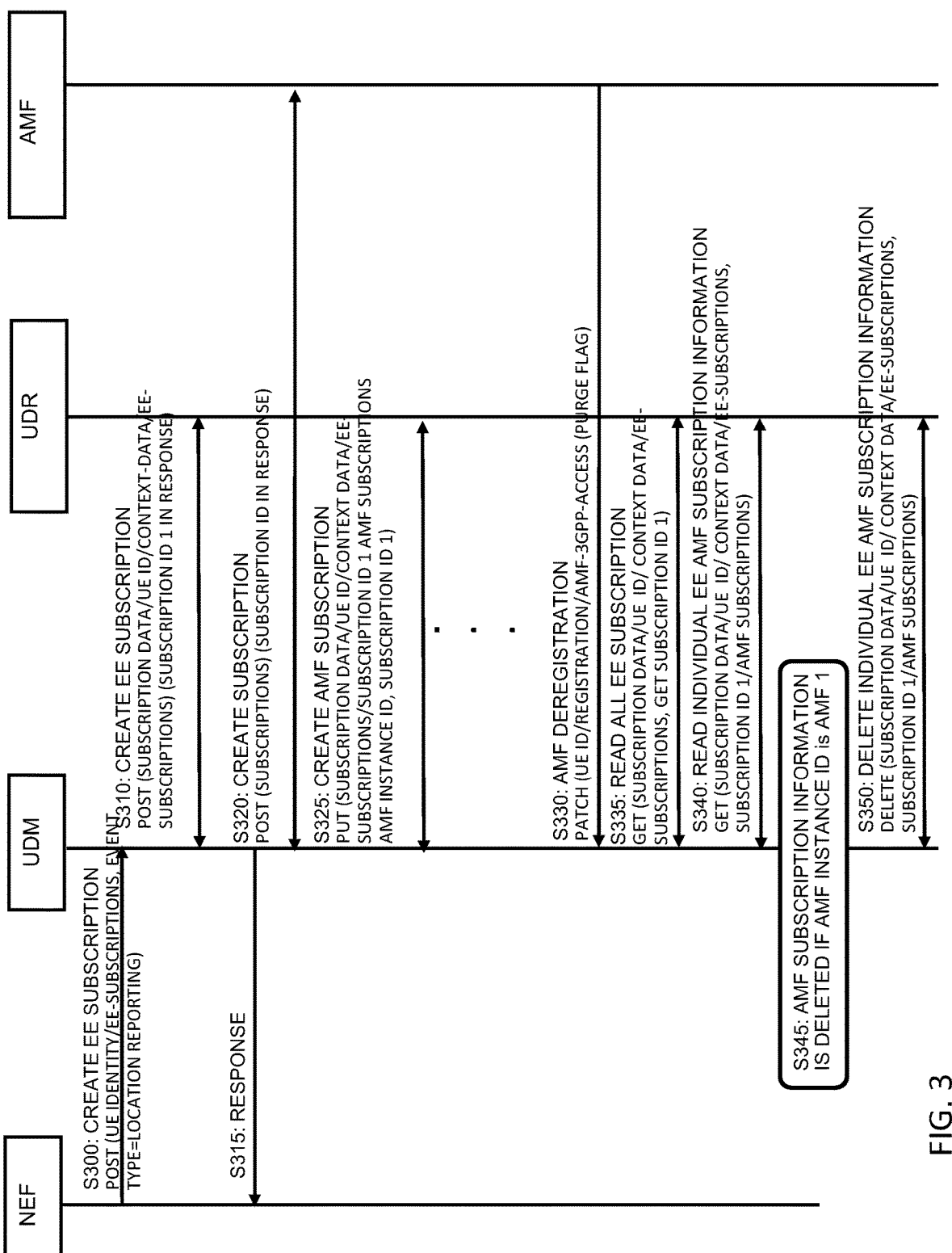
FIG. 3 shows a signaling diagram illustrating an example
of a procedure conducted in an event exposure flow.

FIG. 3 shows a signaling diagram illustrating an example of a procedure conducted in an event exposure flow; which illustrates the above described situation. In the example according to FIG. 3, an example is described where an UDM EE Subscription API flow from the NEF for an event, such as an event related to a report of a location and having an EventType=LOCATION_REPORTING, is explained. Furthermore, FIG. 3 shows also a flow of an event requiring the retrieval of subscription information, wherein in the example of FIG. 3 a case is shown where a NF, such as an AMF, de-registers with the UDM. In this case, UDM retrieves all the EE subscriptions and the corresponding AMF subscription information for the same in order to delete the AMF subscriptions corresponding to the deregistered AMF.

In S300, a NF being a service consumer, in this case the NEF as indicated above, sends a request to the UDM to create an EE subscription for an event location reporting. The NEF sends a POST request to the UDM including an indication of the UE (UE ID), an indication of the subscription (EE subscription) and an indication of the event type, ( . . . /{ueId}/ee-subscription, EventType=Location Reporting), so as to create a subscription as present in a message body. The payload body of the POST request contains a representation of the individual subscription resource to be created.

In S310, the UDM sends a request to the UDR to create a EE subscription for the event location reporting. The UDM sends a corresponding POST request to the UDR including an indication of the UE (UE ID), and indication that context data are concerned, and an indication of the subscription (EE subscription) ( . . . /{ueId}/context-data/ee-subscription), so as to create a subscription being stored in the UDR. In a response to the message from the UDM, an indication of a subscription identification (subsid 1) is provided.

When the subscription is successful, the UDM responds in S315 to the NEF with a "201 Created" response message, for example with a message body containing a representation of the created subscription.

In S320, a subscription of the AMF for the UE for which the EE subscription is made is conducted between the UDM and the AMF. That is, a subscription of the AMF is created by sending a POST request to the UDM so as to create a subscription as present in a message body. The payload body of the POST request contains a representation of the individual subscription resource to be created. In a response, an indication of the subscription identification (subsid 1) is provided.

In S325, the subscription data in the UDR are modified or updated according to the subscription of the AMF. That is, the UDM sends a PUT request to the UDR. The payload body contains the new data for the resource. That is, information indicating subscription data, the UE ID, that context data are concerned, the EE subscription, the subscription IF (subsid 1), the AMF subscription information (amf-subscriptions), an identification of the AMF instance (amfinstanceid) is provided to the UDR for storing.

When the update is successful, the UDR respond with a "200 OK", for example.

It is to be noted that a plurality of subscriptions can be created/modified and stored in the UDR, as described in connection with S300 to S325 discussed above. However, for the sake of simplicity, only one process is described here.

As described above, it is now assumed that a NF, such as the AMF, conducts a procedure which requires that subscription data are retrieved from the UDR. That is, in the example according to FIG. 3, the AMF sends in S330 a request to the UDM to deregister (purge) from the UDM. The request contains the UE's identity (/{ueId}) and an instruction to set a purge Flag within the Amf3GppAccessRegistration resource.

In S335, the UDM sends a GET request to the UDR to retrieve all the EE subscriptions of the UE. Moreover, the UDM sends in S340 a GET request to the UDR to retrieve the corresponding AMF subscription information for the same in order to be able to delete the AMF subscriptions corresponding to the deregistered AMF. The UDR sends in response to the GET request a "200 OK" message with a message body containing the requested subscription information.

However, in the flow of the GET requests, depending on the number of subscriptions, the UDM has to retrieve AMF subscription information for each individual EE subscription.

For example, assuming that there are multiple EE Subscriptions for a UE. For example, three EE subscriptions are created:

/subscription-data/{ueId}/context-data/ee-subscriptions/
{subsId-1}/amf-subscriptions
/subscription-data/{ueId}/context-data/ee-subscriptions/
{subsId-2}/amf-subscriptions
/subscription-data/{ueId}/context-data/ee-subscriptions/
{subsId-3}/amf-subscriptions For every such instance, the process in S340 is to be performed.

The number of read requests may be even further increased when some individual EE subscriptions also have other sub-subscriptions, such as subscriptions for an SMF or a HSS, e.g. SmfSubscriptionInfo and/or HssSubscriptionInfo. An example is shown in the following:

/subscription-data/{ueId}/context-data/ee-subscriptions/
{subsId-3}/hss-subscriptions
/subscription-data/{ueId}/context-data/ee-subscriptions/
{subsId-4}/smf-subscriptions
/subscription-data/{ueId}/context-data/ee-subscriptions/
{subsId-5}/smf-subscriptions
/subscription-data/{ueId}/context-data/ee-subscriptions/
{subsId-6}/hss-subscriptions
/subscription-data/{ueId}/context-data/ee-subscriptions/
{subsId-7}/hss-subscriptions However, when the UDM reads all EE Subscriptions (as in S335), the UDM does not know which individual EE subscription objects have a valid AmfSubscriptionInfo. Consequently, the UDM triggers seven individual reads to read the AmfSubscriptionInfo for each individual EE subscription. However, as can be seen above, there are only three subscriptions having AmfSubscriptionInfo to be read.

The problem also exists when UDM processes other EE Subscription related APIs where it has to read all the subscriptions (Amf,Smf,HssSubscriptionInfo) corresponding to an EE Subcription (IndividualEeSubscription).

In view of the above-described situation, a large number of read procedures may be required, resulting in some attempts to read non-existent resources in the UDR, a performance degradation at the UDR, a service consumer, and all NFs in the path, in addition to increased network resource consumption.

With reference to FIG. 3, when the subscription information are retrieved/read, the UDM decides in S345 that the AMF subscription information is to be deleted when the AMF instance is AMF 1 (the AMF which deregisters in S330). Then, in S350, the UDM sends a request to the UDR to delete a corresponding data record which is identified as individual EE AMF subscription information. That is, the UDM sends in S350 a DELETE request to the UDR indicating the UE ID, the subscription ID (subsid 1) and the AMF subscriptions.

When the delete process is successful the UDR responds with a "204 No Content", for example.

In the following, different exemplifying embodiments will be described for illustrating a processing for improving a mechanism for providing and obtaining subscription information contained e.g. in EE subscription resources. For this, as an example of a communication network to which examples of embodiments may be applied, a communication network architecture based on 3GPP standards for a communication network, such as 5G/NR, is used, without restricting the embodiments to such an architecture, however. It is obvious for a person skilled in the art that the embodiments may also be applied to other kinds of communication networks, e.g. Wi-Fi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc. Furthermore, without loss of generality, the description of some examples of embodiments is related to a mobile communication network, but principles of the disclosure can be extended and applied to any other type of communication network, such as a wired communication networks as well.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A system architecture of a (tele)communication network including a mobile communication system where some examples of embodiments are applicable may include an architecture of one or more communication networks including wireless access network subsystem(s) and core network(s). Such an architecture may include one or more communication network control elements or functions, access network elements, radio access network elements, access service network gateways or base transceiver stations, such as a base station (BS), an access point (AP), a NodeB (NB), an eNB or a gNB, a distributed or a centralized unit, which controls a respective coverage area or cell(s) and with which one or more communication stations such as communication elements, user devices or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, core network elements or network functions, such as gateway network elements/functions, mobility management entities, a mobile switching center, servers, databases and the like may be included.

The general functions and interconnections of the described elements and functions, which also depend on the actual network type, would be apparent to those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of embodiments may also be able to communicate with other networks, such as a public switched telephone network or the Internet, as well as with individual devices or groups of devices being not considered as a part of a network, such as monitoring devices like cameras, sensors, arrays of sensors, and the like. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. for such a usage. Generally, a network function can be implemented either as a network element on a dedicated hardware, as a software instance running on a dedicated hardware, or as a virtualized function instantiated on an appropriate platform, e.g., a cloud infrastructure.

Furthermore, a network element or network functions, such as a management network element or management network function like a UDM, or a data repository element or data repository function, like an UDR, or other network elements or network functions, as described herein, and any other elements, functions or applications may be implemented by software, e.g. by a computer program product for a computer, and/or by hardware. For executing their respective processing, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case-by-case.

Examples of embodiments are related to an improved mechanism for providing and obtaining subscription information contained in EE subscription resources. Specifically, according to some examples of the disclosure, there are provided means for accessing 'EeSubscriptions' resource from UDM over Nudr interface as defined in UDR DR service APIs. For example, in case of a 3GPP network, 3GPP specifications TS 29.503, TS 29.504, and TS 29.505 are to be noted which capture service details and flows to be considered in examples of embodiments.

According to examples of embodiments, a first solution being proposed is to support filtering the read of subscription information sub-resources within individual EE subscription. This filtering is based, for example, on a network function type being of interest (e.g. AMF), i.e. NfType, and/or on a specific NF instance (e.g. AMF 1), which is identified e.g. by an NfInstanceId. The UDR uses this filtering information and prepares a suitable reply, e.g. by returning the required data in a single read response.

For example, for implementing the first solution, the API between UDM and UDR is enhanced such that it specifies that only a subset of the resource is read. For example, it can be indicated that in the resource/subscription-data/{ueId}/context-data/ee-subscriptions only a subset is read, which relate to an AMF. This can be indicated e.g. by using query parameters, such as an AMF ID (amf-instaceId).

Figure 4:
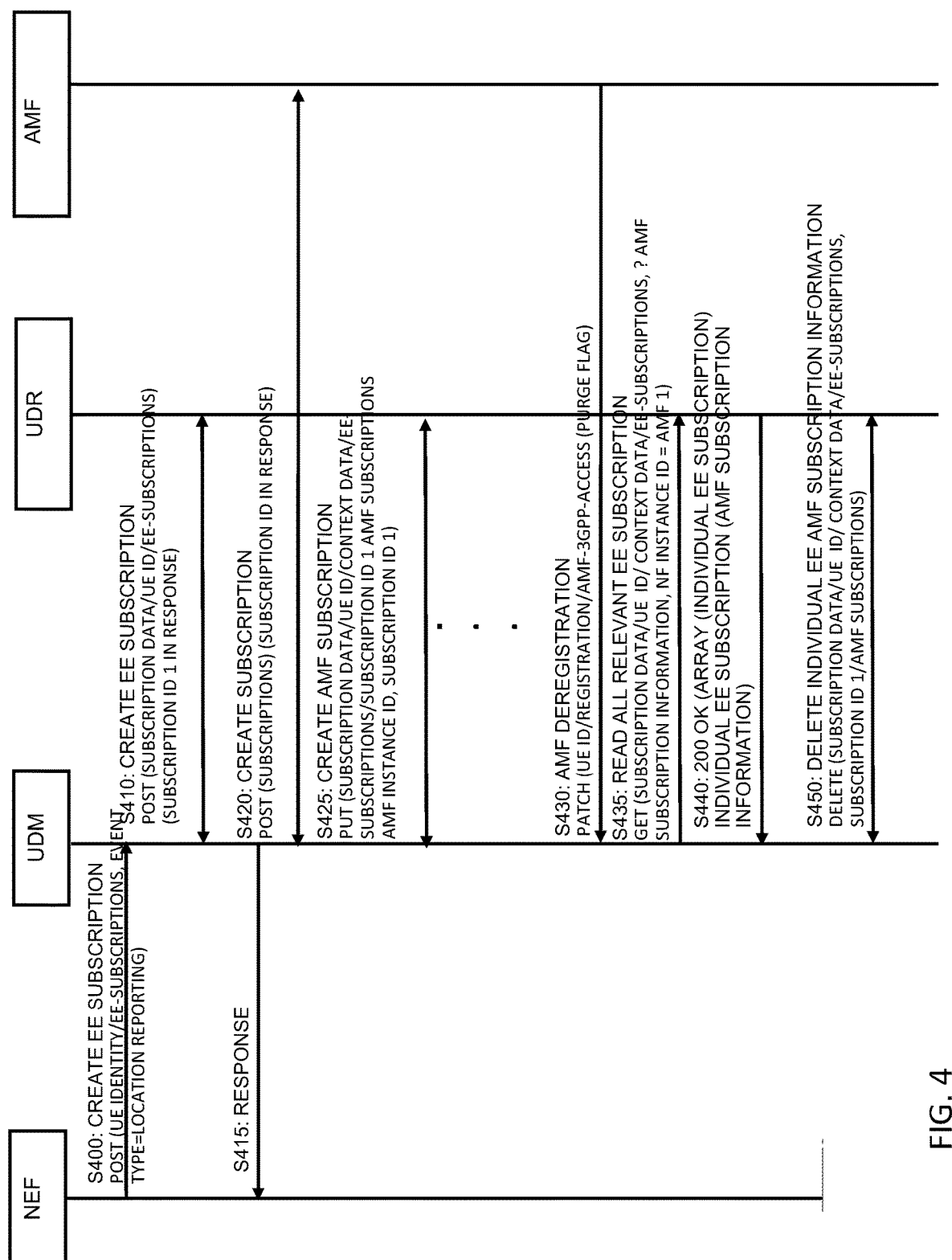
FIG. 4 shows a signaling diagram illustrating an example
of a procedure conducted in an event exposure flow accord-
ing to examples of embodiments.

Referring to FIG. 4, a signaling diagram is shown illustrating an example of a procedure conducted in an event exposure flow according to examples of embodiments. The example according to FIG. 4 is based on that of FIG. 3, so that only differences in the process flow according to examples of embodiments will be explained in further detail.

FIG. 4 thus shows a flow for creating subscriptions and also a flow of an event requiring the retrieval of subscription information, wherein in the example of FIG. 4 a case is shown where an NF, such as an AMF, de-registers with the UDM.

The processes in S400 to S425 concerning the creation or modification/update of subscription data in the UDR in FIG. 4 are substantially equivalent to the processes described in S300 to S325 of FIG. 3, so that a description of S400 to S425 is not repeated.

Also S430, where the deregistration of the AMF is indicated, corresponds to S330 of FIG. 3, so that a description thereof is not repeated here.

In S435, the UDM starts retrieving subscription data. In the example of embodiments as described in connection with FIG. 4, the UDM sends a GET request to the UDR to retrieve only relevant EE subscriptions of the UE. That is, the UDM sends a GET request to the UDR to a subset of the resource which is indicated by adding query information in the GET request. For example, a GET request as indicated below is sent:

> GET/subscription-data/{ueId}/context-data/ee-subscriptions?nfIdentifiers=[(AMF,amf1)]

That is, the query information, indicated by the "?" in the request, informs that only subscription information are to be read which contain AMF subscription information, wherein as a further indication of the requested subset an NF instance ID for AMF 1 is added. That is, according to some examples, as query information for identifying which data are to be returned, an indication of a type of network function (e.g. AMF), an indication of a designated network function (e.g. AMF 1), or both of the type indication and designated network function indication can be provided.

The UDR responds to the GET request in S440 with a single response message which includes the requested subscription information, which can be selected by the UDR on the basis of the query information. For example, in S440, a "200 OK" response is sent to the UDM in the following format:

> Response Body:
> Array(IndividualEeSubscription).

The IndividualEeSubscription will include the AmfSubscriptionInfo as well.

In S450, the process requiring the subscription information can thus be executed on the basis of the information obtained in S440. That is, in S450, the UDM sends a request to the UDR to delete a corresponding data record which is identified as individual EE AMF subscription information. That is, the UDM sends in S450 a DELETE request to the UDR indicating the UE ID, the subscription ID (subsid 1) and the AMF subscriptions as retrieved in S440.

By means of the above-described approach, it is possible to avoid a large number of read procedures, and that attempts to read non-existent resources in the UDR are also avoided. Consequently, performance at the UDR, a service consumer, and all NFs in the path can be improved, and network resource consumption can be reduced.

In the following, an example of an embodiment for the above-described approach is implemented as indicated. This example of an embodiment is provided to illustrate how the above mechanism can be introduced in standardized processing.

In case of the data repository function, e.g. the UDR, to the Nudr_DataRepository service API for subscription data, which is indicated e.g. in 3GPP specification TS29.505 and consists of an OpenAPI 3.0.0 specifications, in YAML format, the following can be set (parts indicated in italic letters represent additions for introducing the aspects discussed above):

```
openapi: 3.0.0
info:
    version: '-'
    title: 'Unified Data Repository Service API file for subscription
data'
    description:
        Unified Data Repository Service (subscription data) .
        The API version is defined in 3GPP TS 29.504.
        © 2022, 3GPP Organizational Partners (ARIB, ATIS, CCSA, ETSI,
TSDSI, TTA, TTC) .
        All rights reserved.
************text not shown for clarity************
/subscription-data/{ueId}/context-data/ee-subscriptions:
    get:
        summary: Retrieves the ee subscriptions of a UE
        operationId: Queryeesubscriptions
        tags:
        - Event Exposure Subscriptions (Collection)
        security:
        - { }
        - oAuth2ClientCredentials:
            - nudr-dr
        - oAuth2ClientCredentials:
            - nudr-dr
            - nudr-dr: subscription-data
        parameters:
        - name: ueId
          in: path
          description: UE id
          required: true
          schema:
            $ref:
'TS29571_CommonData. yaml#/components/schemas/VarUeId'
        - name: supported-features
          in: query
          description: Supported Features
          schema:
            $ref:
'TS29571_CommonData.yaml#/components/schemas/SupportedFeatures'
        - name: event-types
          in: query
          required: false
          description: Event Types
          schema:
```

```
            type: array
            items:
                $ref:
'TS29503_Nudm_EE.yaml#/components/schemas/EventType'
            minItems: 1
          style: form
          explode: false
        - name: nfIdentifiers
          in: query
          description: NF Identifiers
          schema:
            type: array
            items:
                $ref: '#/components/schemas/NfIdentifier'
            minItems: 1
          style: form
          explode: false
        responses:
            '200':
                description: Expected response to a valid request
                content:
                    application/json:
                        schema:
                            type: array
                            items:
                                $ref: '#/components/schemas/EeSubscription'
            default:
                $ref:
'TS29571_CommonData.yaml#/components/responses/default'
************text not shown for clarity************
components:
    schemas:
************text not shown for clarity************
        NfIdentifier:
            type: object
            required:
            - nfType
            properties:
                nfType:
                    $ref:
'TS29510_Nnrf_NFManagement.yaml#/components/schemas/NFType'
                nfInstanceId:
                    $ref:
'TS29571_CommonData.yaml#/components/schemas/NfInstanceId'
************text not shown for clarity************
```

It is to be noted that valid values for nfType are e.g. AMF, HSS and SMF.

As additional elements used for URI query parameters supported by the GET method on a resource, the following elements can be used:

TABLE 1

| Name | Data type | P | Cardinality | Description |
|---|---|---|---|---|
| supported-features | SupportedFeatures | O | 0 . . . 1 | see 3GPP TS 29.500 [8] clause 6.6 |
| event-types | array(EventType) | O | 1 . . . N | Indicates only to return the EE subscription data which contains at least one of the indicated Event Types and returned monitoring configuration data in EE subscription data only contains the data related to the indicated event types. |
| nfIdentifiers | NfIdentifiers | O | 1 . . . N | Indicates to return relevant EE subscription data along with associated Subscription resources created and stored while initiating subscriptions to NFs identified by NfType and NfInstanceId |

For defining the type NfIdentifier, the following can be used:

TABLE 2

| Attribute name | Data type | P | Cardinality | Description |
|---|---|---|---|---|
| nfType | NFType | M | 0 . . . 1 | NF Type as defined in 3gpp TS 29.510. |
| nfInstanceId | NfInstanceId | O | 0 . . . 1 | Instance ID of the NF as defined in 3GPP TS 29.571. |

In case of the management network function, e.g. the UDM, to the Nudm service API, which is indicated e.g. in 3GPP specification TS29.503 and consists of an OpenAPI 3.0.0 specifications, in YAML format, the following can be set (parts indicated in italic letters represent additions for introducing the aspects discussed above):

```
openapi: 3.0.0
info:
    version: '1.2. 0-alpha.5'
    title: 'Nudm_EE'
    description: |
************text not shown for clarity************
schemas:
        EeSubscription :
            type: object
            required:
                - callbackReference
                - monitoringConfigurations
            properties:
                callbackReference:
                    $ref: 'TS29571_CommonData.yaml#/components/schemas/Uri'
                monitoringConfigurations:
                    description: A map (list of key-value pairs where
ReferenceId serves as key) of MonitoringConfigurations
                    type: object
                    additionalProperties:
```

-continued

```
                        $ref: '#/components/schemas/MonitoringConfiguration'
                        minProperties: 1
                    reportingOptions :
                        $ref: '#/components/schemas/ReportingOptions'
                    supportedFeatures:
                        $ref:
'TS29571_CommonData.yaml#/components/schemas/SupportedFeatures'
                    subscriptionId:
                        type: string
                    contextInfo :
                        $ref:
'TS29503_Nudm_SDM.yaml#/components/schemas/ContextInfo'
                    epcAppliedInd:
                        type: boolean
                        default: false
                    scefDiamHost:
                        $ref:
'TS29571_CommonData.yaml#/components/schemas/DiameterIdentity'
                    scefDiamRealm:
                        $ref:
'TS29571_CommonData.yaml#/components/schemas/DiameterIdentity'
                    notifyCorrelationId:
                        type: string
                    amfSubcsriptionInfoList:
                        type: array
                        items:
$ref: 'TS29505_Subscription_Data.yaml#/components/schemas/AmfSub-
scrip-
tionInfo'
                        minItems: 1
                    smfSubcsriptionInfo:
$ref: 'TS29505_Subscription_Data.yaml#/components/schemas/SmfSub-
scrip-
tionInfo'
                    hssSubcsriptionInfo:
$ref: 'TS29505_Subscription_Data.yaml#/components/schemas/HssSub-
scrip-
tionInfo'
************text not shown for clarity************
```

Moreover, as additional elements used for the definition of type EeSubscription, the following elements can be added:

TABLE 3

| Attribute name | Data type | P | Cardinality | Description | Applicability |
|---|---|---|---|---|---|
| amfSubcsriptionInfoList | array(AmfSubscriptionInfo) | O | 1 . . . N | List AMF subscription info | |
| smfSubcsriptionInfo | SmfSubscriptionInfo | O | 0 . . . 1 | SMF subscription info | |
| hssSubcsriptionInfo | HssSubscriptionInfo | O | 0 . . . 1 | HSS subscription info | |

Figure 5:
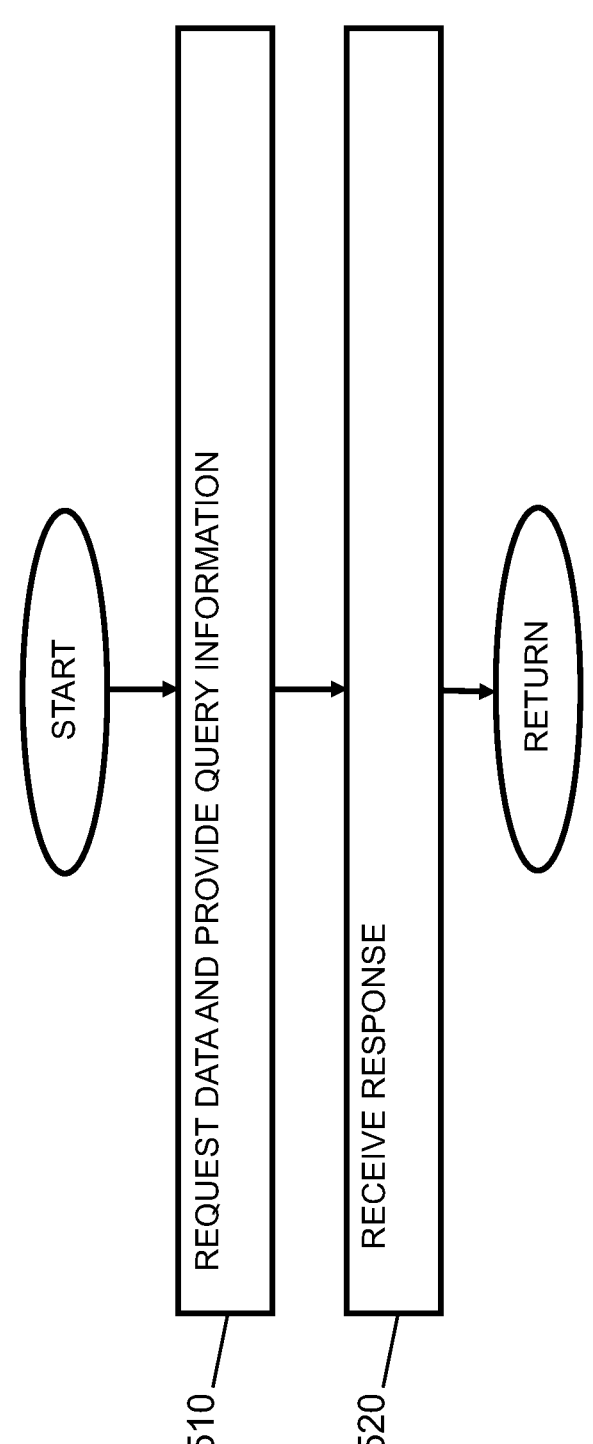
FIG. 5 shows a flow chart of a processing conducted in a
management network element or management network
function, such as a UDM, according to some examples of
embodiments.

FIG. 5 shows a flow chart of a processing executed by a network element or network function configured to operate as a management network element, such as a UDM. That is, FIG. 5 shows a flowchart related to a processing conducted by a UDM as also described in connection with FIG. 4.

In S510, with a request for data, for example with a request for retrieving subscription information related data, as described in connection with FIG. 4, for example, query information as a part of a data retrieving process provided. The data retrieving process is used to read subscription data from a data repository element or data repository function, such as the UDR. The query information are set for filtering sub-resources of subscription information within the subscription data, wherein it is also indicated thereby that it is requested to the requested data in a single response.

According to examples of embodiment, the subscription data are comprised in event exposure (EE) subscription resources including a plurality of individual event exposure subscriptions having subscription information of a communication element or communication function (i.e. UE) for at least one communication network element or communication network function. That is, as described above as one example, the subscription data relate individual EE subscriptions with, for example, AMF (SMF, HSS) related subscription information. According to examples of embodiments, the query information can use different indications.

For example, a specific communication network element type or communication network function type is indicated, such as AMF, SMF. Alternatively, an identification of a designated communication network element or a designated communication network function can be used, such as AMF 1 as an ID of the AMF to be considered. As a further alternative, both of the above two options can be used in parallel, i.e. type information and ID information.

Moreover, according to examples of embodiments, as already indicated, a communication network element or communication network function to which the query information is related (i.e. for which a filtering is to be conducted) comprises one or more of a HSS, an AMF, and an SMF.

According to examples of embodiment, the data retrieving process is triggered by an event causing a further processing based on retrieved subscription data. For example, when a network element or network function deregisters (as in the example in FIG. 4), data for all related subscriptions have to be retrieved.

According to examples of embodiments, the data retrieving process is conducted by using a communication via an API to the data repository element or data repository function. The data are requested by using a GET message including an indication that subscription data are requested, an identification of a communication element or communication function (UE ID), an indication that context data are concerned, an indication regarding event exposure (EE) subscriptions and the query information represented, which can be one or both of an indication of a specific communication network element type (e.g. AMF) and an ID a designated communication network element (e.g. AMF 1).

In S520, the requested data are received with the single response. The single response including the requested data comprises, for example, an array of subscription information including subscription information for the indicated at least one of the specific communication network element type or communication network function type, and the identified designated communication network element or designated communication network function.

According to further examples of embodiments, the response is processed for retrieving subscription data related to a communication element or communication function. With the result of the processing, for example, the trigger event can be further processed, e.g. by deleting entries of the AMF being deregistered.

According to further examples of embodiments, a subscription procedure for creating an EE subscription of a communication element or communication function (UE) in the data repository element or data repository function is executed, as also described in connection with FIG. 3 or 4. According to some examples of embodiments, the subscription procedure can also include a processing as described below with regard to a second solution as described in FIG. 9, for example.

According to examples of embodiments, the management network element or management network function of the communication network is a UDM of a 3GPP based communication network, and the data repository element or data repository element function is a UDR of the 3GPP based communication network.

Figure 6:
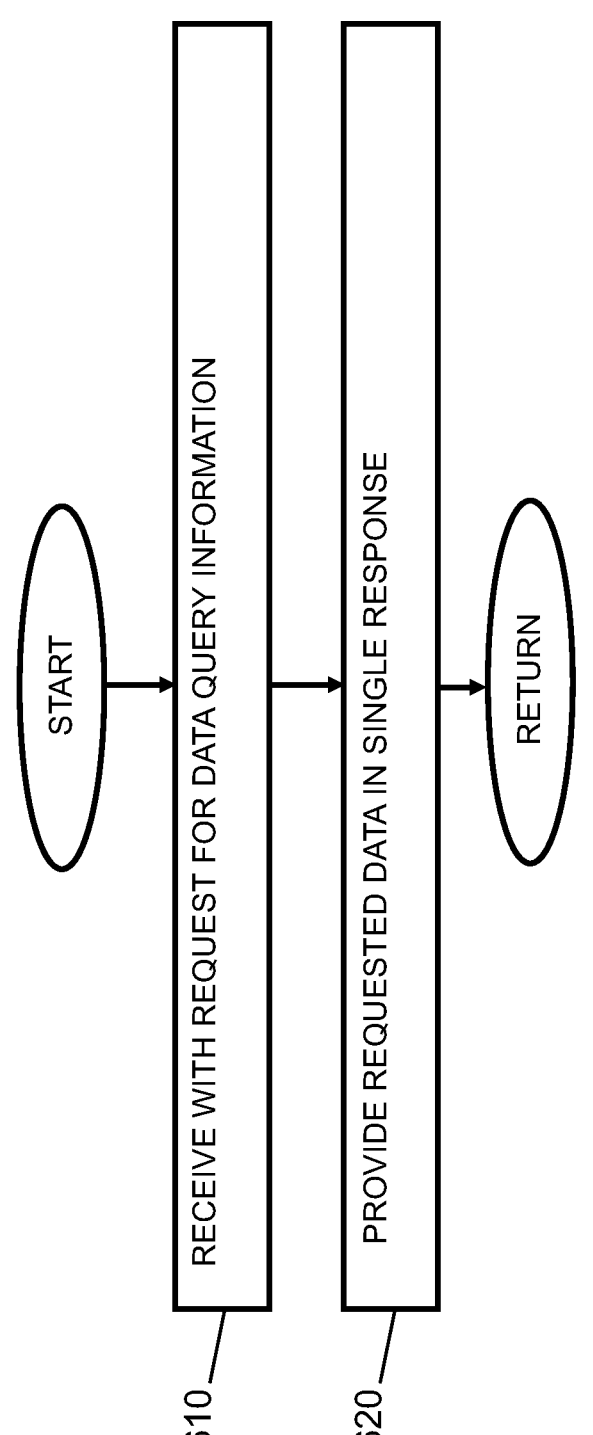
FIG. 6 shows a flow chart of a processing conducted in a
data repository element or data repository function, such as
a UDR, according to some examples of embodiments.

FIG. 6 shows a flow chart of a processing executed by a network element or network function configured to operate as a data repository element, such as a UDR. That is, FIG. 6 shows a flowchart related to a processing conducted by a UDR as also described in connection with FIG. 4.

In S610, with a request for data, query information is received as part of a data retrieving process. to read subscription data from the data repository element or data repository function, The data retrieving process is used to read subscription data. The query information is set for filtering sub-resources of subscription information within the subscription data, wherein it is also indicated thereby that it is requested to the requested data in a single response.

According to examples of embodiment, the subscription data are comprised in event exposure (EE) subscription resources including a plurality of individual event exposure subscriptions having subscription information of a communication element or communication function (i.e. UE) for at least one communication network element or communication network function. That is, as described above as one example, the subscription data relate individual EE subscriptions with, for example, AMF (SMF, HSS) related subscription information.

According to examples of embodiments, the query information can use different indications. For example, a specific communication network element type or communication network function type is indicated, such as AMF, SMF. Alternatively, an identification of a designated communication network element or a designated communication network function can be used, such as AMF 1 as an ID of the AMF to be considered. As a further alternative, both of the above two options can be used in parallel, i.e. type information and ID information.

Moreover, according to examples of embodiments, as already indicated, a communication network element or communication network function to which the query information is related (i.e. for which a filtering is to be conducted) comprises one or more of a HSS, an AMF, and an SMF.

According to examples of embodiments, the request for data is obtained by a communication via an API to the data repository element or data repository function, wherein the request includes a GET message including an indication that subscription data are requested, an identification of a communication element or communication function (UE ID), an indication that context data are concerned, an indication regarding event exposure (EE) subscriptions and the query information represented, which can be one or both of an indication of a specific communication network element type (e.g. AMF) and an ID a designated communication network element (e.g. AMF 1).

According to further examples of embodiment, the request is processed, wherein the query information is considered for selecting subscription data related to a communication element or communication function (UE) to be returned to a management network element or management network function having requested the data.

In S620, the requested data are provided within the single response to a management network element or management network function, such as a UDM.

For example, according to examples of embodiment, as the single response, an array of subscription information is forwarded to the UDM including subscription information for the indicated at least one of the specific communication network element type or communication network function type, or the identified designated communication network element or designated communication network function.

According to further examples of embodiments, a subscription procedure for storing an EE subscription of a communication element or communication function (UE) is executed on the basis of information provided by the management network element or management network function, as also described in connection with FIG. 3 or 4. According to some examples of embodiments, the subscription procedure can also be based on a processing as described below with regard to a second solution as described in FIG. 9, for example.

According to examples of embodiments, the management network element or management network function of the communication network is a UDM of a 3GPP based communication network, and the data repository element or data repository element function is a UDR of the 3GPP based communication network.

Figure 7:
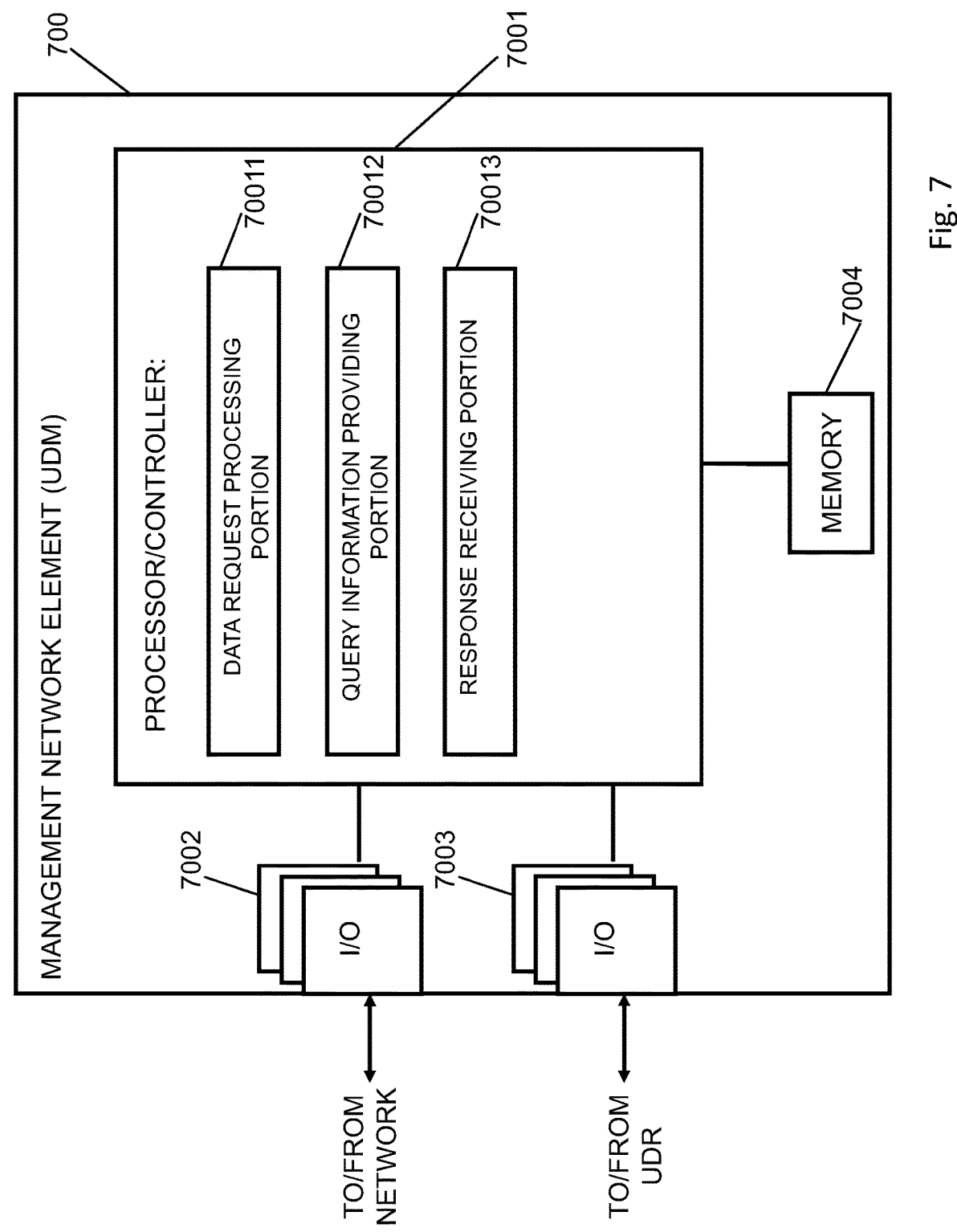
FIG. 7 shows a diagram of a network element or network
function, acting as a management network element, accord-
ing to some examples of embodiments.

FIG. 7 shows a diagram of a network element or network function configured as a management network element, e.g. UDM 700 (in accordance with the UDM 80 shown in FIGS. 1 and 2, for example), according to some examples of embodiments, as described in connection with FIG. 4, which is configured to conduct processing according to examples of embodiments of the disclosure. It is to be noted that the network element or function, such as the UMD 700, may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The UDM 700 shown in FIG. 7 may include processing circuitry, a processing function, a control unit or a processor 7001, such as a CPU or the like, which is suitable for executing instructions given by programs or the like related to the control procedure. The processor 7001 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 7002 and 7003 denote input/output (I/O) units or functions (interfaces) connected to the processor or processing function 7001. The I/O units 7002 may be used for communicating with network functions such as the NEF or the AMF, as shown in FIG. 1. The I/O units 7003 may be used for communicating with a data repository element or function, such as the UDR (UDR 800, described below), as shown in FIG. 2. The I/O units 7002 and 7003 may be combined units including communication equipment towards several entities, or may include a distributed structure with a plurality of different interfaces for different entities. Reference sign 7004 denotes a memory usable, for example, for storing data and programs to be executed by the processor or processing function 7001 and/or as a working storage of the processor or processing function 7001. It is to be noted that the memory 7004 may be implemented by using one or more memory portions of the same or different type of memory.

The processor or processing function 7001 is configured to execute processing related to the above-described data retrieval procedure. In particular, the processor or processing circuitry or function 7001 includes one or more of the following sub-portions. Sub-portion 70011 is a processing portion which is usable as a portion for conducting a data request processing. The portion 70011 may be configured to perform processing according to S510 of FIG. 5. Furthermore, the processor or processing circuitry or function 7001 may include a sub-portion 70012 usable as a portion providing query information. The portion 70012 may be configured to perform a processing according to S510 of FIG. 5. In addition, the processor or processing circuitry or function 7001 may include a sub-portion 70013 usable as a portion for receiving a response (from the UDR). The portion 70013 may be configured to perform a processing according to S520 of FIG. 5.

Figure 8:
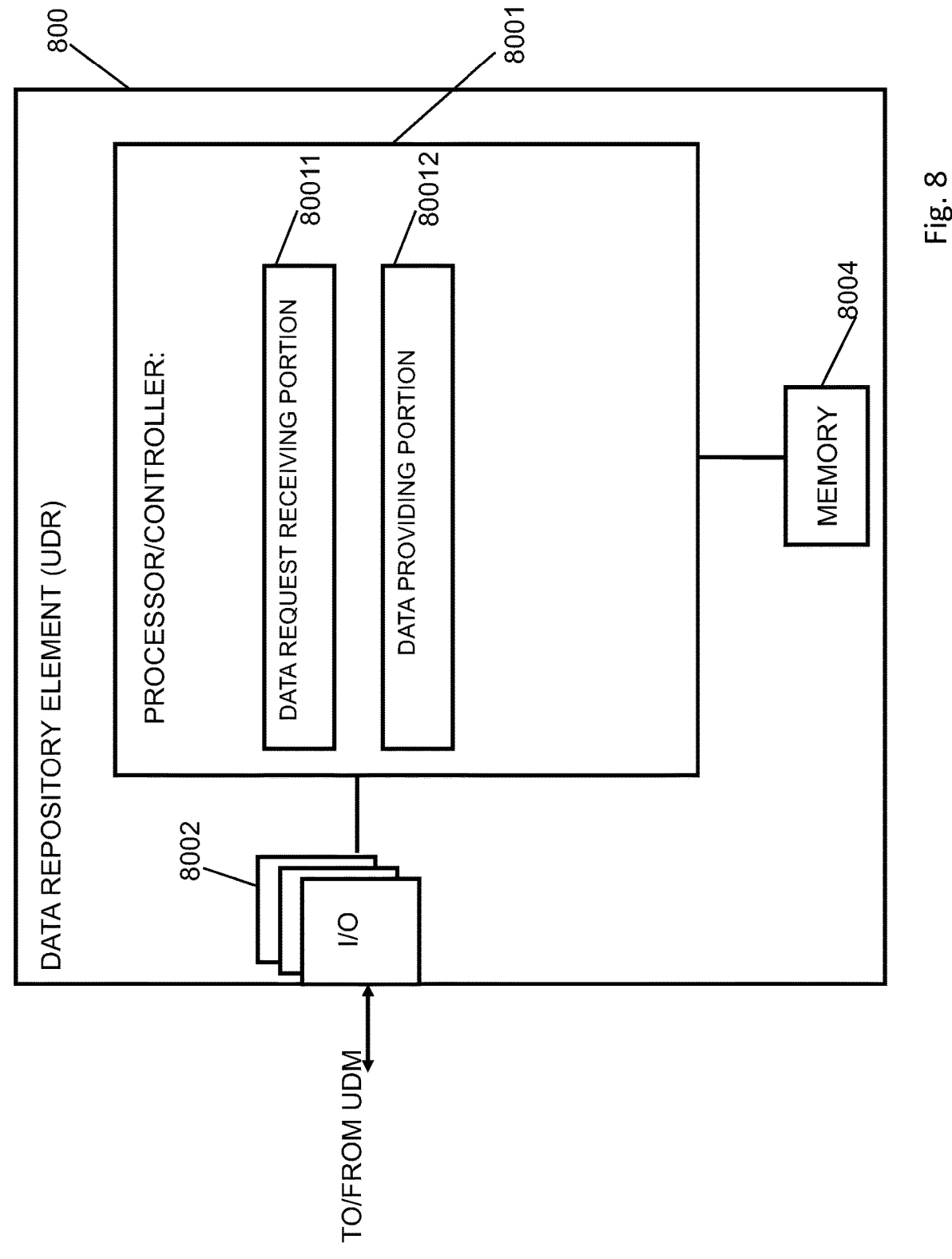
FIG. 8 shows a diagram of a network element or network
function, acting as a data repository element, according to
some examples of embodiments.

FIG. 8 shows a diagram of a network element or network function configured as a data repository network element, e.g. UDR 800 (in accordance with the UDR 90 shown in FIGS. 1 and 2, for example), according to some examples of embodiments, as described in connection with FIG. 4, which is configured to conduct processing according to examples of embodiments of the disclosure. It is to be noted that the network element or function, such as the UDR 800, may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The UDR 800 shown in FIG. 8 may include processing circuitry, a processing function, a control unit or a processor 8001, such as a CPU or the like, which is suitable for executing instructions given by programs or the like related to the control procedure. The processor 8001 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 8002 denotes input/output (I/O) units or functions (interfaces) connected to the processor or processing function 8001. The I/O unit 8002 may be used for communicating with network functions such as the UDM, as shown in FIG. 1. The I/O unit 8002 may be combined units including communication equipment towards several entities, or may include a distributed structure with a plurality of different interfaces for different entities. Reference sign 8004 denotes a memory usable, for example, for storing data and programs to be executed by the processor or processing function 8001 and/or as a working storage of the processor or processing function 8001. It is to be noted that the memory 8004 may be implemented by using one or more memory portions of the same or different type of memory.

The processor or processing function 8001 is configured to execute processing related to the above-described data retrieval procedure. In particular, the processor or processing circuitry or function 8001 includes one or more of the following sub-portions. Sub-portion 80011 is a processing portion which is usable as a portion for receiving a data request. The portion 80011 may be configured to perform processing according to S610 of FIG. 6. Furthermore, the processor or processing circuitry or function 8001 may include a sub-portion 80012 usable as a portion providing data. The portion 80012 may be configured to perform a processing according to S620 of FIG. 6.

In the above-described examples of embodiments, a first solution has been discussed where filtering of the read of subscription information sub-resources within individual EE subscription is conducted. In the following, another approach for overcoming the above indicated issues is discussed which represent a second solution according to some further examples of embodiments.

In this second solution, as an alternative, it is proposed to introduce new field in an individual EE subscription that indicates the presence of subscription information for e.g. an AMF, SMF, HSS. That is, it is indicated in the EE subscription by means of the information field that Amf/Smf/Hss SubscriptionInfos are present. This allows to avoid read requests towards non-existent sub-resources.

For example, according to further examples of embodiments, when a subscription is created and stored in the UDR, in the creation/modification procedure, a new field is added to the individual EE subscription that indicates the presence of Amf, Smf, Hss subscription information. When referring to FIG. 3, a corresponding process can be considered in S310 or S325, for example.

That is, according to the second solution, a read for sub-resources, as conducted in S340 of FIG. 3, for example, such as for AMF subscription information (AmfSubscriptionInfo) is only triggered if it is determined, for example when checking the information obtained in S335 of FIG. 3, that the information field contained in the individual EE subscription being read indicates the existence of such subscription information (i.e. AmfSubscriptionInfo) for this individual EE Subscription.

By means of the second solution, it is possible to reduce the number of read procedures by avoiding attempts to read non-existent resources in the UDR. Consequently, performance at the UDR, a service consumer, and all NFs in the path can be improved and network resource consumption can be reduced.

For the second solution, in case of the management network function, e.g. the UDM, to the Nudm service API, which is indicated e.g. in 3GPP specification TS29.503 and consists of an OpenAPI 3.0.0 specifications, in YAML format, the following can be added:

```
EeSubscription:
  type: object
  required:
    - callbackReference
    - monitoringConfigurations
  properties:
    callbackReference:
      $ref: 'TS29571_CommonData. yaml#/components/schemas/Uri'
    .
    .
    .
    activeNfSubscriptions :
      type: array
```

-continued

```
      items:
        $ref:
'TS29571_CommonData. yaml#/components/schemas/NFType'
        minItems: 1
```

Figure 9:
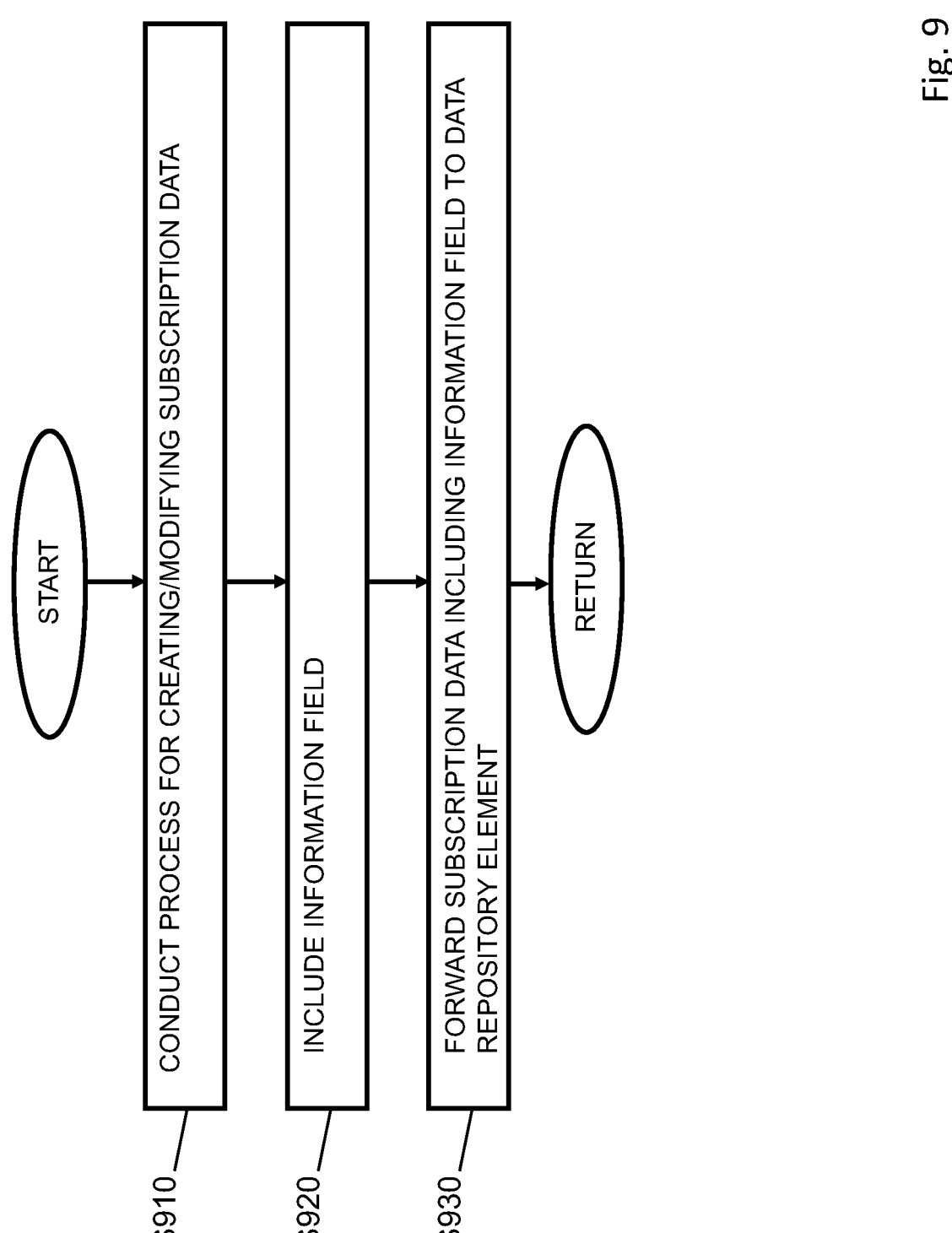
FIG. 9 shows a flow chart of a processing conducted in a
management network element or management network
function, such as a UDM, according to some further
examples of embodiments.

FIG. 9 shows a flow chart of a processing executed by a network element or network function configured to operate as a management network element, such as a UDM, according to the second solution described above. That is, FIG. 9 shows a flowchart related to a processing conducted by a UDM according to the second solution.

In S910, conduct a process for creating or modifying subscription data in a data repository element or data repository function is conducted.

In S920, an information field is included in subscription information of the subscription data, wherein the information field informs that specific sub-resources of subscription information are present in subscription data. For example, as described above as one example, the subscription data relate to individual EE subscriptions with, for example, AMF (SMF, HSS) related subscription information.

According to examples of embodiments, the process for creating or modifying the subscription data is conducted by using a communication via an API to the data repository element or data repository function, wherein a POST message or a PUT message is used for providing the subscription data including the information field.

According to examples of embodiments, the data repository element or data repository element function is a UDR of the 3GPP based communication network.

In S930, subscription data including the information field are forwarded to the data repository element or data repository function.

According to some further examples of embodiments, after the subscription procedure, a data retrieving process is conducted which includes reading of subscription data from the data repository element or data repository function. When a response including requested subscription data is received, it is checked whether the received subscription data comprises an information field indicating that specific sub-resources of subscription information (e.g. AMF subscription information, and the like) are present in subscription data. In case the presence of the sub-resources is indicated by the information field, a reading process of subscription information corresponding to the sub-resources is triggered. If it is not indicated by the information field that specific sub-resources of subscription information are present (e.g. no AMF subscription information are stored), the reading process is not executed, i.e. no read request is sent.

According to examples of embodiments, the subscription data are comprised in event exposure (EE) subscription resources including a plurality of individual event exposure subscriptions having subscription information of a communication element or communication function (i.e. UE) for at least one communication network element or communication network function. That is, as described above as one example, the subscription data relate to individual EE subscriptions with, for example, AMF (SMF, HSS) related subscription information.

According to examples of embodiments, sub-resources of subscription information are related to a specific communication network element type or communication network function type is indicated, such as AMF, SMF. Alternatively, they are related to designated communication network element or a designated communication network function, such as AMF 1 as an ID of the AMF to be considered. As a further alternative, they are related to both of the above two options, i.e. type information and ID information.

Moreover, according to examples of embodiments, a communication network element or communication network function to which the query information is related (i.e. for which a filtering is to be conducted) comprises one or more of a HSS, an AMF, and an SMF.

Figure 10:
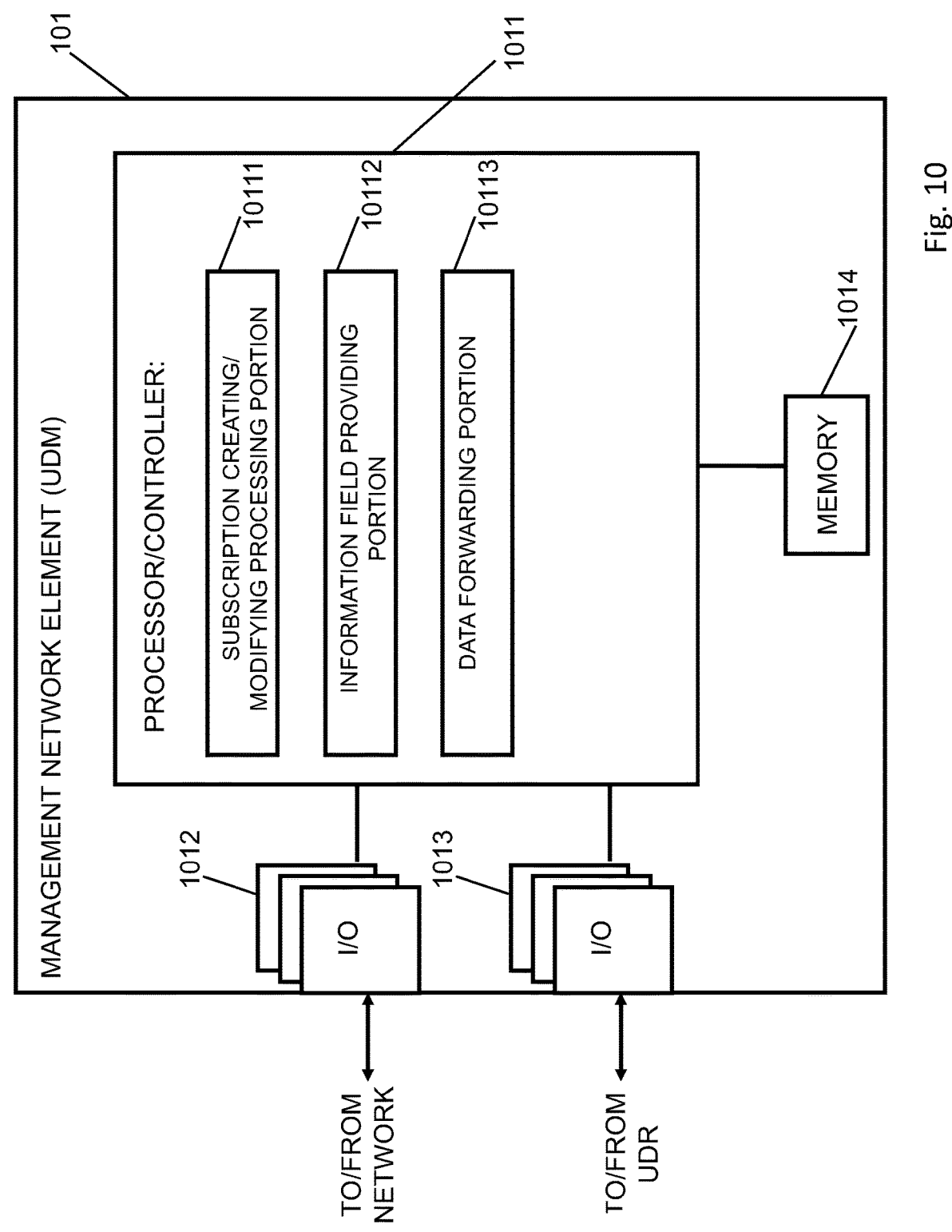
FIG. 10 shows a diagram of a network element or network
function, acting as a management network element, accord-
ing to some further examples of embodiments.

FIG. 10 shows a diagram of a network element or network function configured as a management network element, e.g. UDM 101 (in accordance with the UDM 80 shown in FIGS. 1 and 2, for example), according to some examples of embodiments, as described above for a second solution, which is configured to conduct a processing according to examples of embodiments of the disclosure. It is to be noted that the network element or function, such as the UMD 101, may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The UDM 101 shown in FIG. 10 may include processing circuitry, a processing function, a control unit or a processor 1011, such as a CPU or the like, which is suitable for executing instructions given by programs or the like related to the control procedure. The processor 1011 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 1012 and 1013 denote input/output (I/O) units or functions (interfaces) connected to the processor or processing function 1011. The I/O units 1012 may be used for communicating with network functions such as the NEF or the AMF, as shown in FIG. 1. The I/O units 1013 may be used for communicating with a data repository element or function such as the UDR 90, as shown in FIG. 2. The I/O units 1012 and 1013 may be combined units including communication equipment towards several entities, or may include a distributed structure with a plurality of different interfaces for different entities. Reference sign 1014 denotes a memory usable, for example, for storing data and programs to be executed by the processor or processing function 1011 and/or as a working storage of the processor or processing function 1011. It is to be noted that the memory 1014 may be implemented by using one or more memory portions of the same or different type of memory.

The processor or processing function 1011 is configured to execute processing related to the above-described data retrieval procedure according to the second solution. In particular, the processor or processing circuitry or function 1011 includes one or more of the following sub-portions. Sub-portion 10111 is a processing portion which is usable as a portion for creating or modifying a subscription. The portion 10111 may be configured to perform processing according to S910 of FIG. 9. Furthermore, the processor or processing circuitry or function 1011 may include a sub-portion 10112 usable as a portion providing an information field. The portion 10112 may be configured to perform a processing according to S920 of FIG. 9. In addition, the processor or processing circuitry or function 1011 may include a sub-portion 10113 usable as a portion for forwarding data. The portion 10113 may be configured to perform a processing according to S930 of FIG. 9.

It is to be noted that examples of embodiments of the disclosure are applicable to various different network configurations. In other words, the examples shown in the above described figures, which are used as a basis for the above discussed examples, are only illustrative and do not limit the present disclosure in any way. That is, additional further existing and proposed new functionalities available in a corresponding operation environment may be used in connection with examples of embodiments of the disclosure based on the principles defined.

According to a further example of embodiments, there is provided, for example, an apparatus for use by a management network element or management network function of a communication network, the apparatus comprising means configured to provide, with a request for data, query information as a part of a data retrieving process to read subscription data from a data repository element or data repository function, the query information being set for filtering sub-resources of subscription information within subscription data and for requesting a return of data according to the request in a single response, and means configured to receive the requested data with the single response.

Furthermore, according to some other examples of embodiments, the above defined apparatus may further comprise means for conducting at least one of the processing defined in the above described methods, for example a method according to that described in connection with FIG. 5.

According to a further example of embodiments, there is provided, for example, an apparatus for use by a data repository element or data repository function of a communication network, the apparatus comprising means configured to receive, with a request for data, query information as part of a data retrieving process to read subscription data from the data repository element or data repository function, the query information being set for filtering sub-resources of subscription information within subscription data and for requesting a return of data according to the request in a single response, and means configured to provide the requested data within the single response to a management network element or management network function.

Furthermore, according to some other examples of embodiments, the above defined apparatus may further comprise means for conducting at least one of the processing defined in the above described methods, for example a method according to that described in connection with FIG. 6.

According to a further example of embodiments, there is provided, for example, an apparatus for use by a management network element or management network function of a communication network, the apparatus comprising means configured to conduct a process for creating or modifying subscription data in a data repository element or data repository function, means configured to include an information field in subscription information of the subscription data, wherein the information field informs that specific sub-resources of subscription information are present in subscription data, and means configured to forward subscription data including the information field to the data repository element or data repository function.

Furthermore, according to some other examples of embodiments, the above defined apparatus may further comprise means for conducting at least one of the processing defined in the above described methods, for example a method according to that described in connection with FIG. 9.

According to a further example of embodiments, there is provided, for example, a non-transitory computer readable medium comprising program instructions for causing an apparatus to perform, when used in a management network element or management network function of a communication network, a processing comprising providing, with a request for data, query information as a part of a data retrieving process to read subscription data from a data repository element or data repository function, the query information being set for filtering sub-resources of subscription information within subscription data and for requesting a return of data according to the request in a single response, and receiving the requested data with the single response.

According to a further example of embodiments, there is provided, for example, a non-transitory computer readable medium comprising program instructions for causing an apparatus to perform, when used in a data repository element or data repository function of a communication network, a processing comprising receiving, with a request for data, query information as part of a data retrieving process to read subscription data from the data repository element or data repository function, the query information being set for filtering sub-resources of subscription information within subscription data and for requesting a return of data according to the request in a single response, and providing the requested data within the single response to a management network element or management network function.

According to a further example of embodiments, there is provided, for example, a non-transitory computer readable medium comprising program instructions for causing an apparatus to perform, when used in a management network element or management network function of a communication network, a processing comprising conducting a process for creating or modifying subscription data in a data repository element or data repository function, including an information field in subscription information of the subscription data, wherein the information field informs that specific sub-resources of subscription information are present in subscription data, and forwarding subscription data including the information field to the data repository element or data repository function.

It should be appreciated that an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines.

embodiments suitable to be implemented as software code or portions of it and being run using a processor or processing function are software code independent and can be specified using any known or future developed programming language, such as a high-level programming language, such as objective-C, C, C++, C #, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present disclosure has been described herein before with reference to particular embodiments thereof, the present disclosure is not limited thereto and various modifications can be made thereto.

The invention claimed is:

1. An apparatus, comprising:

at least one processor, and at least one memory storing instructions which, when executed by the at least one processor, cause the apparatus at least to:

provide, with a request for data, query information as a part of a data retrieving process to read subscription data from a data repository element or a data repository function, the query information being set for filtering sub-resources of subscription information within the subscription data and for requesting a return of the data according to the request in a single response;

conduct the data retrieving process by using a communication via an application programming interface to the data repository element or the data repository function;

provide the request for the data by using a get message, the get message including:

an indication that the subscription data are requested, an identification of a communication element or a communication function, an indication that context data are concerned, an indication regarding event exposure subscriptions, and the query information comprising:

an indication of at least one of a specific communication network element type or a specific communication network function type, and an identification of at least one of a designated communication network element or a designated communication network function; and receive the single response including the data.

2. The apparatus according to claim 1, wherein the instructions, when executed by the at least one processor, cause the apparatus at least to: process the single response for retrieving the subscription data related to the communication element or the communication function.

3. The apparatus according to claim 1, wherein the subscription data are comprised in event exposure subscription resources including a plurality of individual event exposure subscriptions having the subscription information of the communication element or the communication function for at least one communication network element or communication network function.

4. The apparatus according to claim 1, wherein the designated communication network element or the designated communication network function, to which the query information is related, comprises at least one of:

a home subscriber server, an access and mobility management element or an access and mobility management function, or a session management element or a session management function of a communication network.

5. The apparatus according to claim 1, wherein the data retrieving process is triggered by an event causing a further processing based on retrieved subscription data from the data.

6. The apparatus according to claim 1, wherein the instructions, when executed by the at least one processor, cause the apparatus at least to: execute a subscription procedure for creating an event exposure subscription of the communication element or the communication function in the data repository element or the data repository function.

7. The apparatus according to claim 1, wherein the single response including the data comprises an array of subscription information including the subscription information filtered for:

the indicated at least one of the specific communication network element type or the specific communication network function type, and the identified at least one of the designated communication network element or the designated communication network function.

8. The apparatus according to claim 1, wherein the instructions, when executed by the at least one processor, cause the apparatus at least to: perform one or more functions of a management network element or a management network function of a communication network.

9. The apparatus according to claim 8, wherein the management network element or the management network function of the communication network is a unified data management element or a unified data management function of a 3GPP based communication network, and wherein the data repository element or the data repository element function is a unified data repository element or a unified data repository function of the 3GPP based communication network.

10. An apparatus, comprising:

at least one processor, and at least one memory for storing instructions which, when executed by the at least one processor, cause the apparatus at least to:

receive, with a request for data, query information as part of a data retrieving process to read subscription data from the apparatus, the query information being set for filtering sub-resources of subscription information within the subscription data and for requesting a return of the data according to the request in a single response, wherein the request for the data is obtained by a communication via an application programming interface to the apparatus, wherein the request for the data comprises a get message, the get message including:

an indication that the subscription data are requested, an identification of a communication element or a communication function, an indication that context data are concerned, an indication regarding event exposure subscriptions, and the query information comprising:

an indication of at least one of a specific communication network element type or a specific communication network function type, and an identification of at least one of a designated communication network element or a designated communication network function; and provide the single response including the data to a management network element or a management network function.

11. The apparatus according to claim 10, wherein the instructions, when executed by the at least one processor, cause the apparatus at least to: process the request, wherein the query information is considered for selecting the subscription data related to the communication element or the communication function to be returned to the management network element or the management network function.

12. The apparatus according to claim 10, wherein the subscription data are related to a communication element or a communication function and are comprised in event exposure subscription resources including a plurality of individual event exposure subscriptions having the subscription information of the communication element or the communication function for at least one communication network element or communication network function.

13. The apparatus according to claim 10, wherein the designated communication network element or the designated communication network function, to which the query information is related, comprises at least one of:

a home subscriber server, an access and mobility management element or an access and mobility management function, or a session management element or a session management function of a communication network.

14. The apparatus according to claim 10, wherein the instructions, when executed by the at least one processor, cause the apparatus at least to: execute a subscription procedure for storing an event exposure subscription of the communication element or the communication function on the basis of information provided by the management network element or the management network function.

15. The apparatus according to claim 10, wherein the single response including the data comprises an array of subscription information including the subscription information filtered for:

the indicated at least one of the specific communication network element type or the specific communication network function type, and the identified at least one of the designated communication network element or the designated communication network function.

16. The apparatus according to claim 10, wherein the instructions, when executed by the at least one processor, cause the apparatus at least to:

perform one or more functions of a data repository element or a data repository element function of a communication network.

17. The apparatus according to claim 16, wherein the management network element or the management network function of the communication network is a unified data management element or a unified data management function of a 3GPP based communication network, and wherein the data repository element or the data repository element function is a unified data repository element or a unified data repository function of the 3GPP based communication network.

18. A method comprising:

providing, with a request for data, query information as a part of a data retrieving process to read subscription data from a data repository element or a data repository function, the query information being set for filtering sub-resources of subscription information within the subscription data and for requesting a return of the data according to the request in a single response;

conducting the data retrieving process by using a communication via an application programming interface to the data repository element or the data repository function;

providing the request for the data by using a get message, the get message including:

an indication that the subscription data are requested, an identification of a communication element or a communication function, an indication that context data are concerned, an indication regarding event exposure subscriptions, and the query information comprising at least one of:

an indication of at least one of a specific communication network element type or a specific communication network function type, or an identification of at least one of a designated communication network element or a designated communication network function; and receiving the single response including the data.

19. The method of claim 18, wherein the designated communication network element or the designated communication network function, to which the query information is related, comprises at least one of:

a home subscriber server, an access and mobility management element or an access and mobility management function, or a session management element or a session management function of a communication network.

20. The method of claim 18, wherein the single response including the data comprises an array of subscription information including the subscription information filtered for at least one of:

the indicated at least one of the specific communication network element type or the specific communication network function type, or the identified at least one of the designated communication network element or the designated communication network function.

\* \* \* \* \*